United States Patent Office 3,093,124
Patented June 11, 1963

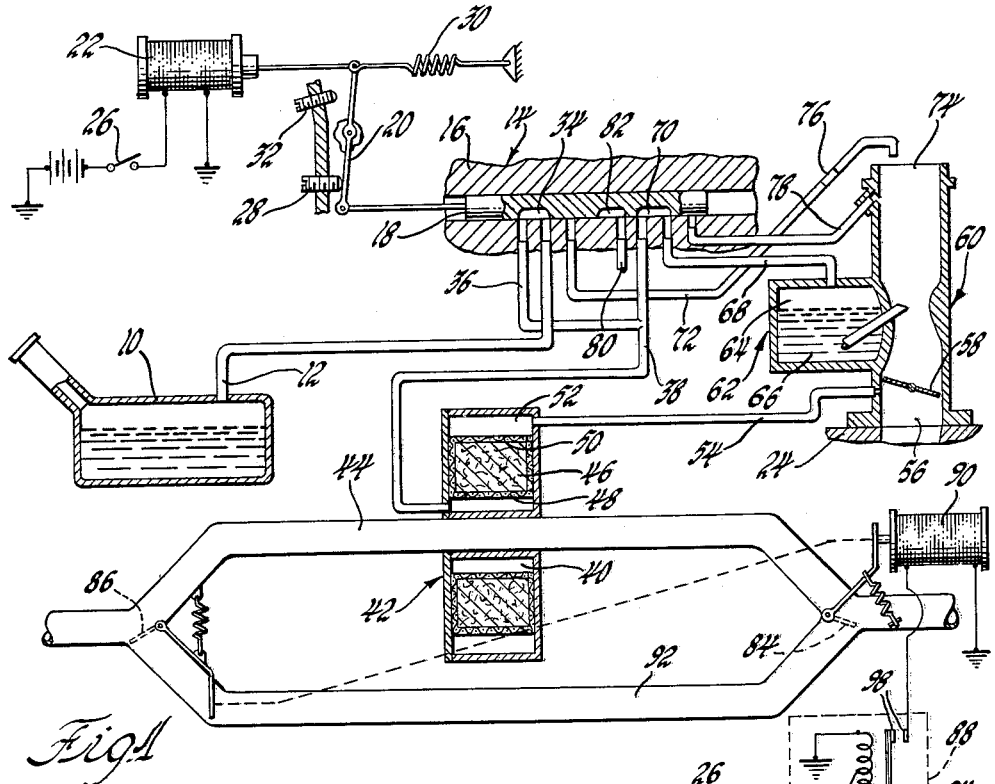
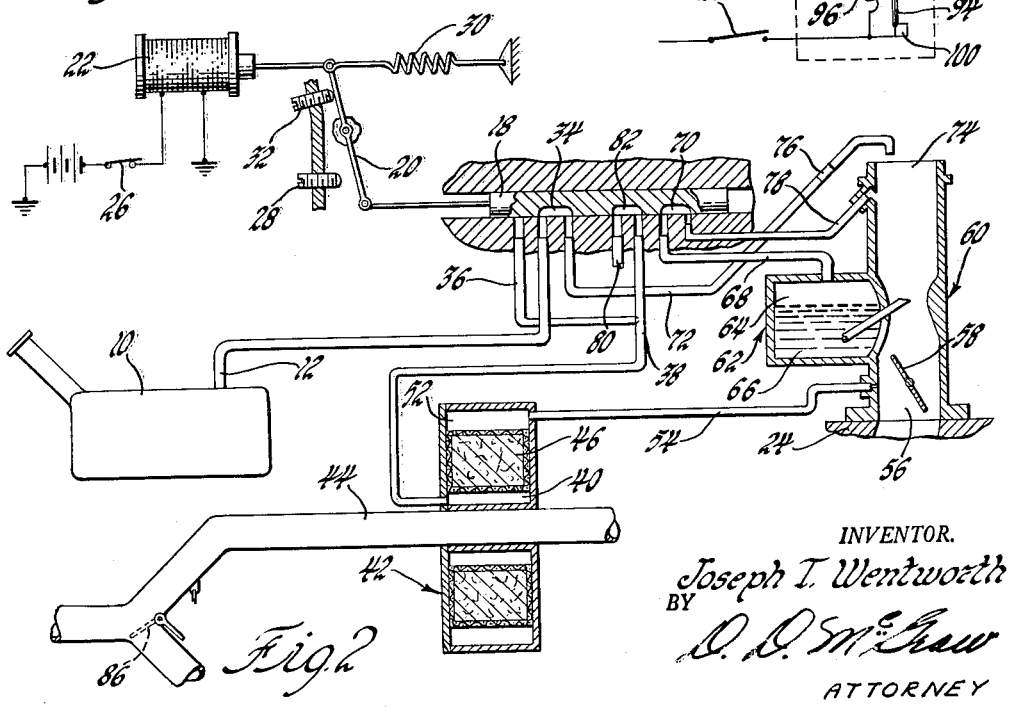

3,093,124
ENGINE FUEL VAPOR RECOVERY SYSTEM AND METHOD
Joseph T. Wentworth, Royal Oak, Mich., assignor to General Motors Corporation, Detroit, Mich., a corporation of Delaware
Filed Dec. 23, 1960, Ser. No. 78,087
20 Claims. (Cl. 123—136)

The invention relates to a fuel vapor recovery system and method for use with engines utilizing fuels such as gasoline and is especially adapted for use with motor vehicle engines.

The atmospheric condition commonly referred to as "smog" has directed much attention to the polluting emissions from automobiles. Many corrective devices have been proposed and utilized to at least partially eliminate fumes from the engine exhaust and crankcase. Another source of hydrocarbon emission from the automobile is the fuel vapor escaping from the fuel system. In particular, gasoline vapors may escape from the external vents of both the fuel tank and carburetor float bowl, either while driving or while at rest. The system and method embodying the invention will substantially eliminate these fuel system losses. Complete control of the fuel vapors is obtained by conducting them from the fuel tank and carburetor float bowl to activated charcoal or other suitable fuel vapor storage means where they are adsorbed or otherwise stored when the engine is not running. The stored vapors are released from the activated charcoal by heat from the engine or other suitable heat source when the engine is later running, and additional vapors emitted from the fuel tank and carburetor float bowl while the engine is running are conducted directly into the engine and burned. The vapor storage means may be cooled to recondition it for vapor storage after a predetermined time sufficient to release the vapors stored therein.

In the drawings:
FIGURE 1 is a schematic diagram having parts broken away and in section and illustrating a fuel vapor recovery system embodying the invention, when the engine is not running; and
FIGURE 2 is similar to FIGURE 1 and illustrates the system when the engine is running.

Referring first to FIGURE 1, which shows the condition of the system when the engine is not operating, the fuel tank 10 is connected through a conduit 12 to a vapor distributor valve assembly 14. This assembly includes valve body 16 and valve 18 reciprocably received therein. Valve 18 is connected through linkage 20 to a solenoid 22 which is placed in the ignition circuit of the engine 24 and is energized when the ignition switch 26 is closed. A suitable stop 28 is provided so that spring 30, connected to linkage 20, will normally hold valve 18 in the position shown in FIGURE 1 when the ignition switch is open. A second stop 32 is provided to properly position valve 18 when solenoid 22 is energized, as is shown in FIGURE 2.

Valve 18 is provided with a recess 34 connecting conduit 12 to conduit 36 when the engine is not operating so that vapor from fuel tank 10 may be conducted, due to the fuel vapor pressure, therethrough to conduit 38 which connects with chamber 40 of an activated charcoal cannister 42 wherein the vapors are stored by adsorption. This cannister may be annular in form so that it fits over an engine exhaust pipe section 44. Activated charcoal 46, or other suitable fuel vapor retaining material, is contained within the cannister between the inner screen 48 and the outer screen 50. These screens are so arranged that chamber 40 is adjacent exhaust pipe 44 and an outer annular chamber 52 is provided. The latter chamber is connected through conduit 54 to the engine intake 56 at a point below the throttle valve 58.

The carburetor 60, which provides the fuel-air mixture for the engine 24, has a carburetor float bowl 62 with its upper chamber 64 above the fuel 66 contained therein connected by conduit 68 to valve assembly 14. Fuel vapor from chamber 64 is connected through valve recess 70 to conduit 38 so that the fuel vapors from the float bowl also pass through the activated charcoal 46 of cannister 42 and are adsorbed.

Valve 18 is shown in FIGURE 2 in the position in which it is held by energized solenoid 22 when ignition switch 26 is closed. Linkage 20 has moved into engagement with a stop 32 to properly locate valve 18 in valve body 16. Conduit 12 from fuel tank 10 is then connected through valve recess 34 to conduit 72 which leads to carburetor air intake 74 through the flame arrester 76. The flame arrester is provided to prevent backfires through the carburetor from reaching the fuel tank 10 and igniting the fuel vapors contained therein. The float bowl upper chamber 64 is now connected through conduit 68 and recess 70 to the air intake 74 of the carburetor through conduit 78. Conduit 38 is now connected to atmospheric air inlet 80 through valve recess 82 so that fresh air passes through conduit 38 and into chamber 40 of cannister 42. Since the engine is now operating and this chamber is adjacent the exhaust pipe 44, the fresh air is heated and drawn through the activated charcoal 46, chamber 52 and conduit 54 by engine vacuum. The heated air heats the charcoal and causes the fuel vapors, earlier adsorbed, to be driven off. The vapors then flow along with the air into the engine intake 56 and are burned in the engine.

It has been found that a temperature of 300° F. to 400° F. is necessary to reactivate the charcoal by driving off the adsorbed vapors within a five-to-ten minute period. The cannister 42 is, therefore, located on a portion of the exhaust pipe 44 which is sufficiently warm to furnish the required charcoal temperature. Other sources of heat, such as an independent electrically or fuel operated heater, may be utilized if circumstances warrant although exhaust heat is preferable since it is already present and not otherwise utilized.

If desired, the portion of exhaust pipe 44 about which cannister 42 is placed may be an exhaust by-pass which is open for a predetermined period of time sufficiently long to reactivate the charcoal when the engine is started, after which the engine exhaust gases will be rerouted so that the charcoal 46 may be cool when the engine is stopped. This eliminates a potential problem which would otherwise exist if the charcoal is still hot when the engine is stopped. Fuel vapors would then immediately be conducted to the charcoal but would not be retained if the charcoal is still at an elevated temperature. Appreciable vapor loss would, therefore, result until the charcoal is sufficiently cool to adsorb the vapors.

The by-pass valves 84 and 86 in the engine exhaust system may be controlled by any suitable means. For example, a thermal actuated time delay switch 88 may be connected in series with ignition switch 26 and, when closed, complete a circuit to actuate electromagnet 90 to move the by-pass valves so that they close the entry and exit ends of exhaust pipe 44 after a suitable time delay. This time delay may be of any desired time and it has been found that ten to fifteen minutes is usually sufficient. Electromagnet 90 will hold valves 84 and 86 in the positions whereby exhaust pipe 44 is closed so long as the ignition switch 26 is closed. Exhaust gases from the engine will then be by-passed through exhaust pipe 92, located away from cannister 42 a sufficient distance to prevent any substantial heat transfer, so that the adsorbent material 46 in the cannister will be quickly returned to its cool, vapor adsorbing condition. Time delay switch 88 may be of any suitable type and a heated bimetallic element type is illustrated. Bimetallic element 94 is heated by coil 96 when ignition switch 26 is closed. When element 94 is sufficiently heated, contacts 98 then close the circuit energizing electromagnet 90. Coil 96 remains energized so long as switch 26 is closed and supplies sufficient heat to maintain contacts 98 in the closed position. A heat sump 100, preferably metallic and of a suitable size, may be provided to obtain the desired timing and also to retain heat so that the contacts 98 are not opened for a short time after the ignition switch is open. This arrangement prevents the cyclic heating of the cannister 42 when the ignition switch is open for some reason for such a short interval that little or no vapor would be adsorbed. The system thus remains ready to adsorb fuel vapor from the time after which all of the vapor has been released by preventing the reheating of the cannister.

A fuel vapor recovery system and method has been disclosed which will recover vapor given off by the engine fuel reservoir and the engine carburetor while the engine is not operating, will release these vapors during engine operation and conduct them to the engine so that they are burned therein, and will conduct fuel vapors given off from these vapor sources while the engine is operating directly to the engine intake so that they are also burned in the engine. The system storage means will be conditioned during engine operation to immediately adsorb fuel vapors when the engine is no longer operating.

I claim:

1. In a fuel vapor recovery system for an internal combustion engine having an air intake and a fuel reservoir, a fuel vapor distribution valve assembly having a first conduit connected with said reservoir in fuel vapor flow relation and a second conduit connected with the engine air intake, fuel vapor storage means, a third conduit interconnecting said valve assembly and said storage means, a fourth conduit interconnecting said storage means and the engine air intake, and means for heating said storage means during engine operation to release fuel vapor stored therein through said fourth conduit to the engine air intake, said valve assembly including a valve having a first position interconnecting said first and third conduits to direct fuel vapor from said reservoir to said storage means to store vapor therein when the engine is not operating and a second position interconnecting said first and second conduits to deliver fuel vapor from said reservoir to the engine air intake when the engine is operating.

2. The system of claim 1 further comprising control means for said heating means actuable to cut off said heating means from said storage means after the fuel vapor has been released therefrom during engine operation.

3. The system of claim 2, said system further comprising conduit means connecting said valve assembly with atmospheric air and closed by said valve when the engine is not operating and interconnected by said valve to said second conduit when the engine is operating to conduct air through said storage means and entrain fuel vapor being released therefrom and conducted to the engine air intake.

4. The system of claim 1, said system further comprising conduit means connecting said valve assembly with atmospheric air and closed by said valve when the engine is not operating and interconnected by said valve to said third conduit when the engine is operating to conduct air through said storage means and entrain fuel vapor being released therefrom and conducted to the engine air intake.

5. In a fuel vapor recovery system for an internal combustion engine having an air intake and a carburetor with a carburetor float bowl containing fuel therein, a fuel vapor distribution valve assembly having a valve therein, fuel vapor storage means, means connected with said storage means for causing release of stored fuel vapor therefrom when the engine is operating, a first conduit interconnecting said valve assembly and said carburetor float bowl in vapor flow relation, a second conduit interconnecting said valve assembly and said storage means, a third conduit interconnecting said valve assembly and the engine air intake, a fourth conduit interconnecting said storage means and the engine air intake to conduct fuel vapor released from said storage means to the engine air intake, and means for positioning said valve to interconnect said first and second conduits to conduct fuel vapor from said float bowl to said storage means to be stored therein when the engine is not operating and for positioning said valve to interconnect said first and third conduits to conduct fuel vapor from said float bowl to the engine air intake when the engine is operating.

6. A fuel vapor recovery system for an internal combustion engine having a fuel reservoir and an air intake and a carburetor with a carburetor float bowl containing fuel therein, said system comprising a fuel vapor distribution valve assembly having a valve movable therein, fuel vapor storage means, means connected with said storage means for causing release of stored fuel vapor therefrom when the engine is operating, a first conduit interconnecting said reservoir and said valve assembly in fuel vapor flow relation, a second conduit interconnecting said carburetor float bowl and said valve assembly in fuel vapor flow relation, a third conduit interconnecting said valve assembly and said storage means, a fourth conduit interconnecting said storage means and the engine air intake for delivering released fuel vapor from said storage means to the engine air intake, fifth conduit means interconnecting said valve assembly and the engine air intake, and valve positioning control means for controlling and positioning said valve in accordance with the engine operating condition to interconnect said first and second conduits with said third conduit to conduct fuel vapor from said reservoir and said float bowl to said storage means to be stored therein when the engine is inoperative, and to interconnect said first and second conduits to said fifth conduit means to conduct fuel vapor from said reservoir and said float bowl to the engine air intake when the engine is operating.

7. The system of claim 6, said system further comprising conduit means connecting said valve assembly with atmospheric air and closed by said valve when the engine is inoperative and interconnected by said valve to said third conduit when the engine is operating to conduct air through said storage means and entrain fuel vapor being released therefrom and conducted to the engine air intake.

8. The system of claim 6 further comprising control means for said fuel vapor release means to operatively disconnect said release means from said storage means after a predetermined period of engine operation.

9. The system of claim 6, said valve control positioning means comprising an electromagnet in the engine ignition circuit and valve control linkage movable by said electromagnet and spring means opposing the energized electromagnet movement of said linkage and a first stop engaged by said linkage under action of said spring when the engine is not operating to position the valve as above described, and a second stop engaged by said linkage under force of said electromagnet to position said valve as above described when the engine is operating.

10. In a fuel vapor recovery system for an internal combustion engine fuel system, adsorption means for storing fuel vapor otherwise released to atmosphere from the engine fuel system when the engine is not operating, said adsorption means being charged with said fuel vapor solely under the action of fuel vapor pressure when the engine is not operating and means for releasing fuel vapor from said adsorbent means and conducting the released fuel vapor to the engine to be burned therein when the engine is operating.

11. The system of claim 10, said fuel vapor adsorption means comprising an annularly compartmented cannister having an inner entry chamber and fuel vapor adsorbing material in an intermediate chamber and an outer discharge chamber, said cannister being disposed about said vapor releasing means.

12. The system of claim 10, said fuel adsorption means being a cannister having fuel adsorbing material contained therein and said vapor releasing means being the engine exhaust pipe extending through said cannister for heating said adsorbing means when the engine is operating to release fuel vapor adsorbed therein.

13. In a fuel vapor recovery system for an internal combustion engine fuel system adsorption, means for storing fuel vapor otherwise released to atmosphere from the engine fuel system when the engine is not operating, said adsorption means being charged with said fuel vapor solely under the action of fuel vapor pressure when the engine is not operating, means for releasing fuel vapor from said adsorption means and conducting the released fuel vapor to the engine to be burned therein when the engine is operating, and means for conducting fuel vapor from the engine fuel system to the engine to be burned therein when the engine is operating.

14. The system of claim 13 further comprising control means for said releasing means to operatively disconnect said releasing means from said adsorption means after a predetermined period of engine operation sufficient to release fuel vapor from said storage means.

15. A method of recovering fuel vapor from an engine fuel system, said method comprising the steps of: adsorbing fuel vapor from the engine fuel reservoir when the engine is not operating, releasing the adsorbed fuel vapor during engine operation, conducting the released vapor to the engine air intake during engine operation and burning the released fuel vapor in the engine, and conducting fuel vapor from the engine fuel reservoir directly to the engine air intake during engine operation and burning the fuel vapor in the engine.

16. A method of recovering fuel vapor from an engine fuel system, said method comprising the steps of: storing fuel vapor from the engine fuel reservoir when the engine is not operating, storing fuel vapor from the engine carburetor float bowl when the engine is not operating, releasing the stored fuel vapor during engine operation, conducting the released vapor to the engine air intake during engine operation and burning the released fuel vapor in the engine, conducting fuel vapor from the engine fuel reservoir directly to the engine air intake during engine operation, bypassing the fuel vapor storage area and burning the fuel vapor in the engine, conducting fuel vapor from the engine carburetor float bowl directly to the engine air intake during engine operation, bypassing the fuel vapor storage area and burning the fuel vapor in the engine.

17. A method of recovering fuel vapor from an engine fuel system, said method comprising the steps of: storing fuel vapor from the engine fuel system when the engine is not operating, releasing the stored fuel vapor during engine operation, conducting the released vapor to the engine air intake during engine operation and burning the released fuel vapor in the engine, conducting fuel vapor from the engine fuel system to the engine air intake during engine operation and burning the fuel vapor in the engine, conducting fresh air through the fuel vapor storage area and entraining fuel vapor therefrom during engine operation, and conducting the fresh air and entrained fuel vapor to the engine air intake during engine operation and burning the fuel vapor therein.

18. A method of recovering fuel vapor from an engine fuel system, said method comprising the steps of: storing fuel vapor from the engine fuel system when the engine is not operating, releasing the stored fuel vapor during engine operation by supplying heat to the stored fuel vapor, conducting fuel vapor from the engine fuel system to the engine air intake during engine operation and burning the fuel vapor in the engine, conducting fresh air through the fuel vapor storage area and entraining fuel vapor therefrom during engine operation, conducting the fresh air and entrained fuel vapor to the engine air intake during engine operation and burning the fuel vapor therein, and removing heat from the fuel vapor storage area after a predetermined period of engine operation.

19. A method of recovering fuel vapor from an engine fuel system, said method comprising the steps of: storing fuel vapor from the engine fuel system when the engine is not operating, releasing the stored fuel vapor during engine operation by supplying heat to the stored fuel vapor, conducting fuel vapor from the engine fuel system to the engine air intake during engine operation and burning the fuel vapor in the engine, conducting fresh air through the fuel vapor storage area and entraining fuel vapor therefrom during engine operation, conducting the fresh air and entrained fuel vapor to the engine air intake during engine operation and burning the fuel vapor therein, and removing heat from the fuel vapor storage area after the fuel vapor has been released therefrom during engine operation.

20. A method of recovering fuel vapor from an engine fuel system, said method comprising the steps of: storing fuel vapor from the engine fuel system when the engine is not operating, releasing the stored fuel vapor during engine operation by supplying heat to the stored fuel vapor, conducting the released vapor to the engine air intake during engine operation and burning the released vapor therein, conducting fuel vapor from the engine fuel system directly to the engine air intake during engine operation, bypassing the fuel vapor storage area and burning the fuel vapor in the engine, and conditioning the fuel vapor storage area for again storing fuel vapor after the fuel vapor is released therefrom during engine operation.

References Cited in the file of this patent

UNITED STATES PATENTS

| | | |
|---|---|---|
| 2,412,019 | Walker | Dec. 3, 1946 |
| 3,001,519 | Dietrich et al. | Sept. 26, 1961 |

FOREIGN PATENTS

| | | |
|---|---|---|
| 1,083,208 | France | June 23, 1954 |